US006993320B1

(12) United States Patent
Brune et al.

(10) Patent No.: US 6,993,320 B1
(45) Date of Patent: Jan. 31, 2006

(54) METHOD AND DEVICE FOR ACCESSING A TELECOMMUNICATIONS NETWORK AND FOR BILLING TELECOMMUNICATION SERVICES

(75) Inventors: Peter Brune, Meckenheim (DE); Ulrike Feuser, Bonn (DE); Michael Langer, London (GB); Patrik Ljungström, Königswinter (DE); Uwe Michel, Bad Honnef (DE); Walter Mohrs, Bonn (DE); Wolfgang Ptacek, Bad Honnef (DE)

(73) Assignee: T-Mobile Deutschland GmbH, Bonn (DE)

( * ) Notice: Subject to any disclaimer, the term of this patent is extended or adjusted under 35 U.S.C. 154(b) by 352 days.

(21) Appl. No.: 10/018,952

(22) PCT Filed: Jun. 16, 2000

(86) PCT No.: PCT/DE00/01903

§ 371 (c)(1),
(2), (4) Date: Apr. 18, 2002

(87) PCT Pub. No.: WO00/79822

PCT Pub. Date: Dec. 28, 2000

(30) Foreign Application Priority Data

Jun. 21, 1999 (DE) ................................. 199 28 343
Mar. 15, 2000 (DE) ................................. 100 12 392

(51) Int. Cl.
*H04Q 7/20* (2006.01)

(52) U.S. Cl. ...................... 455/406; 455/406; 455/407; 455/408; 455/409; 455/433; 455/432; 455/414; 455/466; 455/456; 455/435

(58) Field of Classification Search ................ 455/406, 455/407, 408, 433, 432, 414, 456, 435, 466; 329/144, 113, 114, 58, 59; 235/380, 382, 235/280
See application file for complete search history.

(56) References Cited

U.S. PATENT DOCUMENTS

| 4,777,646 A |   | 10/1988 | Harris ........................ 379/91 |
| 5,537,474 A | * | 7/1996 | Brown et al. ............... 380/248 |
| 5,592,535 A | * | 1/1997 | Klotz ......................... 455/406 |

(Continued)

FOREIGN PATENT DOCUMENTS

| WO | WO 96/05706 | 2/1996 |
| WO | WO 98/34393 | 8/1998 |

*Primary Examiner*—Emmanuel L. Moise
*Assistant Examiner*—Julio Perez
(74) *Attorney, Agent, or Firm*—Baker & Daniels

(57) ABSTRACT

The invention relates to a method and a device for accessing a telecommunication network and for billing telecommunication services, whereby there are presented new processes, as compared to those of classical mechanisms of network providers, services are offered to their customers and fees are charged for providing the same. In this context the invention primarily concerns novel access mechanisms and access media to a telecommunications network, modified security mechanisms as well as innovative counting methods. The invention is characterized in that authentication methods are used in the telecommunication network, which permit a subscriber to certify at any one freely choosable point in time that a payment for a service which has been solicited or which is to be solicited, is provided or has already been provided.

9 Claims, 3 Drawing Sheets

U.S. PATENT DOCUMENTS 5,748,720 A * 5/1998 Loder .......................... 455/406
6,036,090 A * 3/2000 Rahman et al. ............. 235/380
6,047,051 A * 4/2000 Ginzboorg et al. ......... 379/130
6,067,529 A * 5/2000 Ray et al. ..................... 705/26
6,226,364 B1 * 5/2001 O'Neil .................... 379/114.2
6,516,193 B1 * 2/2003 Salmela et al. ........... 455/432.3
6,587,880 B1 * 7/2003 Saigo et al. ................. 709/225

* cited by examiner

METHOD AND DEVICE FOR ACCESSING A TELECOMMUNICATIONS NETWORK AND FOR BILLING TELECOMMUNICATION SERVICES

This application is a 371 of PCT of PCT/DEC00/01903 Jun. 16, 2000.

The invention relates to a method and to a device for accessing a telecommunications network and for billing telecommunications services.

The described invention presents novel processes with respect to the classical mechanisms of network operators (as a rule mobile radio) for them to make services available to their customers and to take payments from the latter for the performance of same. In this context, it is primarily a matter of new access mechanisms and of means for the (mobile) telecommunication network, for modified security mechanisms, as well as for innovative accounting methods. In the interest of simplification the invention is described in the following on the basis of mobile radio networks of the GSM standard, but it is also applicable to other telecommunication networks, insofar as the limit conditions given in the specification are also applicable to these networks.

In general it can be said that a mobile radio telephone services operator, by means of his telecommunication network, sets up an infrastructure which makes possible the utilization of certain services (primarily telephony). These services can be used by any subscriber under the fulfillment of certain boundary conditions, in return for payment. The network operator decides in each individual case to which subscriber he allows access to his telecommunication network (and therewith to his services), and which subscriber he excludes from the claiming of the services associated with the access. In the classical case there are two set-ups that allow a subscriber an access entitlement to a telecommunication network:

a) on a subscription basis:
The subscriber signs a contract with a home operator, which makes possible for the subscriber the use of certain services for the running time of the contract. Typical for this set-up is that the user pays as a rule a continuous basic amount and, for the claiming of services, a quantity-dependent fee. The payment occurs as a rule on a creditor basis per monthly account.

b) on a prepaid basis:
The subscriber buys from the Home Operator a certain type and amount of services and pays for these in advance. For this he is entitled to the use of the network and of the areas particular to the purchased scope agreed upon. The network operator checks the type and amount of the services used and, after the subscriber has used up his purchase contingent, again withdraws the access entitlement.

Especially for the GSM mobile radio networks, there exist two variants for the utilization of the telecommunication services:

a) The subscriber uses exclusively the infrastructure of the Home Operator. The payment for this use is made according to one of the above processes.

b) The subscriber uses at least in part the infrastructure of another network operator (Visited Operator). The payment is made to the Home Operator according to the above processes. Moreover, without influencing the subscriber, for the accessing of the foreign network corresponding compensation payments are made between the operators (Roaming Fall: roaming case).

The set-ups described make it clear that the control of the network operator over the access entitlement of the subscribers represents a central function. Both in the case of the exclusive utilization of the home network and also in the roaming case, in the use of a foreign network there are defined mechanisms for the GSM which ensure the authenticity of the subscriber.

The technical medium which makes this possible is the chip card or subscriber identity module (SIM) in combination with data in the network, for example data which are deposited in the home register (Ht.R) in the authentication center (AC), or in the visitor register (VLR). Ultimately the SIM represents the basis that permits the operator (Home or Visited) to check the access entitlement of the subscriber.

WO 98 34393 discloses a "Prepay" telecommunication system which has a "prepay" call management platform which is connected directly to an exchange station (Vermittlungsstelle) and has a subscriber data bank for the storage of subscriber data as well as arrangements for the "Prepay" payment development. "Prepay" calls are conducted first to the call management platform, where the credit account of the subscriber is checked. If the credit account shows a sufficient amount, the conversation (call) is forwarded to the exchange station, which establishes the desired connection. If an unregistered Roaming call is detected by the call management platform, then various payment possibilities are offered to the Roaming subscriber for selection. If, for example, the payment type by means of credit card is selected by the subscriber, the latter must report the credit card number to the call management platform, which checks the credit card number and releases the connection request on successful checking.

The problem of the invention is to propose a system and a process for access to telecommunication networks and for the billing of the telecommunication services that, as compared to the classical mechanisms, is simpler and more convenient both for the network operator and also for the subscriber.

This problem is solved by the present invention.

The classical set-up ensures two fundamental points about the access mechanisms described:

a. The network operator knows who the subscriber is
b. The network operator knows that he is receiving (or already has received) payment for the service claimed.

Substantially considered, actually only point b) is decisive. This is likewise ensured according to the invention, in which case, however, the classical set-up is abandoned.

According to the invention there holds, as in the classic case, the following:
  the network operator makes available an infrastructure and services;
  these can be used in return for payment;
  the network operator controls the access to these services.

In contrast to the two classical possibilities oversubscription or overpayment in advance (Prepaid) in order to obtain access entitlement to the network—according to one form of the invention the following is provided:

The subscriber must in advance (or subsequently) notify the network operator in some manner (or must convince this party) that a payment for the service requested (or to be requested) either is being made, or has already been made, as he:

a) proves beyond doubt his identity and a dependability associated therewith (for example: "I am the federal Chancellor of the Federal Republic of Germany", using a digital signature, for example.

b) pays directly over dependable mechanisms (EC card, electronic exchange)

c) proves beyond doubt his association with a dependable third party who takes responsibility for the payment (a credit card organization, for example).

If the subscriber can fulfill one of the above-mentioned requests a), b) or c), then primarily the claim of the network operator to obtaining a payment from the subscriber is satisfied. Depending on the process carried out, and on the process environment, even the point "Who is the subscriber?" is to be fulfilled, which is not compulsorily required.

Ever according to variants in character and in form of execution, the demands of the network operator in regard to the certainty of payment by the subscriber are surely different, also in comparison to the classical set-up. The measure of security lies solely in the judgment or estimation of the network operator. For the clarification of this fact there serves the classical set-up in the GSM network, in which the network operator decides on the technical security of the SIM;

decides freely about the authentication algorithm (even the selection of a simple "XOE-algorithm" would be allowed):

he himself determines the individual subscriber key (Ki) (even a constant key for all the subscribers would be allowed);

decides on the security level of the entire key management process (generation, transport, storage).

According to a preferred form of execution of the invention it is provided to use a credit card as payment medium. All applications of hitherto which describe the use of credit cards as payment medium presume that the subscriber in principle has an access entitlement to a communication network, which he has already obtained by one of the above variants (subscription, Prepaid). The paying per credit card (predominantly of third parties) is settled in this way (likewise over the credit card). There is a band width, there, of forms of execution possibilities which differ in security and in user-friendliness. Let there be mentioned, for example, the following variants:

the subscriber gives his credit card number to a search server;

he uses the keyboard (DTMF-tones) for the input of his credit card number;

he sends an SMS to a special server with his credit card data;

with the aid of his MSISDN or IMSI an allocation to his credit card is established (which the subscriber has made known in advance to the network operator).

What is novel in the process described here is that there is made possible for the subscriber the claiming of telecommunication services even without valid (classical) access entitlement, as he proves his good faith with respect to the network operator by means of a credit card.

In the identification process over the credit card again different variants are conceivable:

a) The subscriber (not registered in the telecommunication network) obtains access only to a certain target (possibly by means of any arbitrary call number), under which he can identify himself by means of input of his credit card number (as a rule on "per call basis"). This may include certain plausibility and security checks as well, such as, for example, pass word protection, the input of additional personal data, on line check of the data with the credit card organization, etc.

b) The subscriber obtains the right to outgoing brief reports and can be registered in a same manner as under a).

c) In the event that the credit card is chip-card based, the subscriber communicates his credit card data electronically, therefore directly with his credit card. This can take place in various ways:

the end apparatus permits an access to a second card reader in which there is inserted the subscriber's credit card;

the end apparatus accepts the credit card instead of the SIM. Instead of the IMSI (as in GSM) the credit card number is sent in full or in part to the network, with the registration procedure. The network operator must be in a position, there, to distinguish this case from the classical registration procedure.

d) The network operator can himself perform an allocation between the SIM (not registered in the classical sense) and a credit card. This requires a previous, unrepeated procedure, in which this allocation is established.

In order to make possible a service (as a rule telephony) for subscribers not reachable by telephone (in the classical sense) then, depending on the character of the set-up certain system preconditions are to be created (here for example GSM) which fulfill the following requirements:

to a not roaming-qualified or non-registered or non-authenticated subscriber an access to the telecommunication network is to be granted;

the access permits only a restricted functionality (for example only outgoing calls (MoC) to a certain target/destination;

concerning the access a payment process is established by means of a credit card;

a sure identification of the subscriber accomplished over the credit card allows him the unrestricted use of the network (for example MoCs);

the billing for the service is based on the use of the credit card (for example on the credit card account).

The described process opens up new possibilities both for the subscribers and also for the network operator concerning service utilization and mutual business relationship, and has a number of advantages.

For the subscriber who is in possession of a credit card this process has the advantage, without valid (telecommunication) subscriber relation or without valid roaming entitlement, nevertheless to obtain the services of a network operator.

For the network operator this likewise has a substantial advantage. The services that the network operator makes available to the (mobile radio) subscribers require no registration. Registration means, for the network operator, the preparing of corresponding system resources, which again is very cost-intensive. Thus every personalized SIM, even if it is not yet activated—therefore has no MSISDN and services allocated to it—has resources in HLR/AC or in the card management system KMS. Since these resources are, on the one hand, expensive and are, on the other hand also numerically limited (number ranges for MSISDN) certain set-ups are forbidden such as, for example, a large-scale keeping in stock of SIMs, or a wide area distributing of cards into the area.

Unregistered SIMs have this restriction in large part. Thus it is entirely imaginable to distribute so-called "Simple-SIMs" in large number to end customers or points of sales, which would open up quite different marketing approaches. By a Simple-SIM in the simplest case a chip card is to be understood, which has, as sole functionality, the capacity of making possible the registration procedure for an end apparatus, as it makes available an IMSI. The IMSI does not have to be registered with the network operator, nor must the Simple-SIM be authenticated for—as described above—the network operator takes this up and with these cards offers the registration credit card. For example, it may be provided that each credit card customer obtains with his monthly bill a Simple-SIM sent to him. This Simple-SIM is installed in a cellular telephone and permits the (restricted) access to a mobile radio network, as the registration is developed over the credit card. The billing for the telecommunication services used occurs likewise over the credit card. Through elimination of the necessity to sign a subscription per contract, it is entirely imaginable to market the simple SIMs also over newsstands, filling stations, trade chains, etc. Likewise the possibility is offered to sign agreements with end apparatus producers, so that the latter will already supply their end apparatuses with a simple SIM of a network operator. This lies both in the interest of the network operator as well as in the interest of the end apparatus producers and end customers, since the end apparatus is already telephonable without the signing of subscription contract.

A variant may consist, for example, in already forming the Simple-SIM in such manner that it can be transformed into a regular SIM in the event that the subscriber decides to enter into a subscription contract with the network operator. This can be accomplished by subsequently applying functions to the SIM (over-the-air) or clearing, as well as bringing the card data into the corresponding system in the network or clearing.

In the following the invention is explained in detail with reference to the drawing figures. In the process further features and advantages of the invention are yielded. In the drawing.

Figure 1:
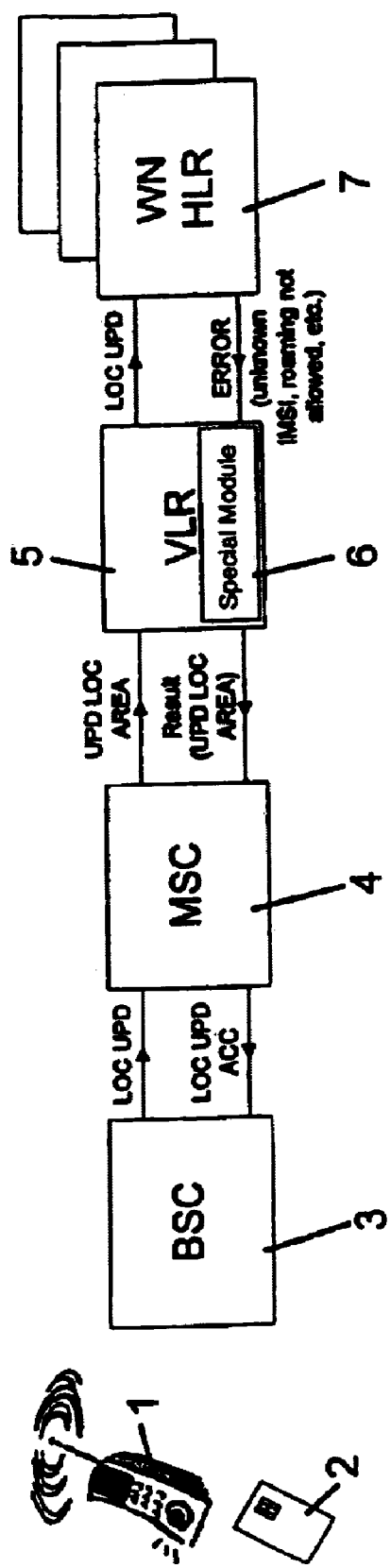
FIG. 1 shows entry into the GSM network by means of error evaluation of the HLR.

The following depictions 1 and 2 show a first implementation variant of the invention. FIG. 1 shows an example for an entry procedure and the system adaptation associated therewith and FIG. 2 describes the identification process of a subscriber by means of credit card.

According to the invention a service use in the mobile radio network is made possible for a subscriber even without a valid SIM. Technical intervention is made there at the point where in the classical case the identification and authentication procedures of the network operator begin.

Let us take as an example the case according to FIG. 1, that an invalid SIM 2 is used in the end apparatus 1, and therewith it is attempted to obtain access to a (GSM) mobile radio network. Invalid SIM means in this context:

not registered (IMSI unknown to the Home Operator)
not capable of roaming (the IMSI belongs to a Home Operator who has not issued any Roaming permit to the subscriber)
not authentic (the authentication procedure fails, for example because of false Ki).

In all cases in the classical case the network operator (sends) a corresponding error report to the end apparatus 1 and denies access to his infrastructure (an exception if made exclusively for the emergency call 911).

The new set-up alters the process of hitherto insofar that the network operator does, to be sure, register that the SIM 2 used has no access entitlement in the classical sense, but he does not in principle deny the access to the subscriber. On the contrary, the network operator offers the subscriber the opportunity to identify himself by means of suitable procedures, alternatively, for example, via his credit card. If the identification is successful in the meaning of the network operator, then the party offers the subscriber a certain spectrum of services.

The network operator achieves a certain "payment guarantee" by the security of the defined identification mechanism as well as by the usual payment guarantees of credit card firms on claiming of service performances to their customers.

A person would like to register himself over a mobile radio apparatus 1 in the mobile radio network, and telephone over this mobile radio network. The subscriber has a subscriber identification module 2 (SIM) which contains an international mobile subscriber identification (IMSI), it being assumed that the IMSI is not registered in the mobile radio network concerned and that the SIM is not roaming-entitled in the mobile radio network concerned. This means that the person normally by means of the SIM 2 cannot register himself in the mobile radio network concerned and avail himself of its services.

According to the invention, however, this is now possible, as first of all a report of the end apparatus 1 occurs at the appropriate base station control 3 (BSC). Since the end apparatus 1 or SIM 2 is not hitherto registered, first of all a Location Update Procedure is sent over the mobile intermediation point 4 (MSC) and the visitor register 5 (VLR) to the home register 7 (HLR), at which inter alia the IMSI deposited on the SIM 2 is transferred to the HLR 7. The HLR 7 checks whether the IMSI is registered—in this case it is not—and sends an error report (ERROR) back to the VLR 5 that the IMSI is not known. In the VLR a special module 6 is arranged, the assignment of which is to catch up these special error reports, evaluate them, and release correspondingly predetermined actions.

Simultaneously the normally executed authentication and cipher procedures are switched off and the Location Update Procedure is concluded, as the accomplished simplified residence registration is positively confirmed.

Figure 2:
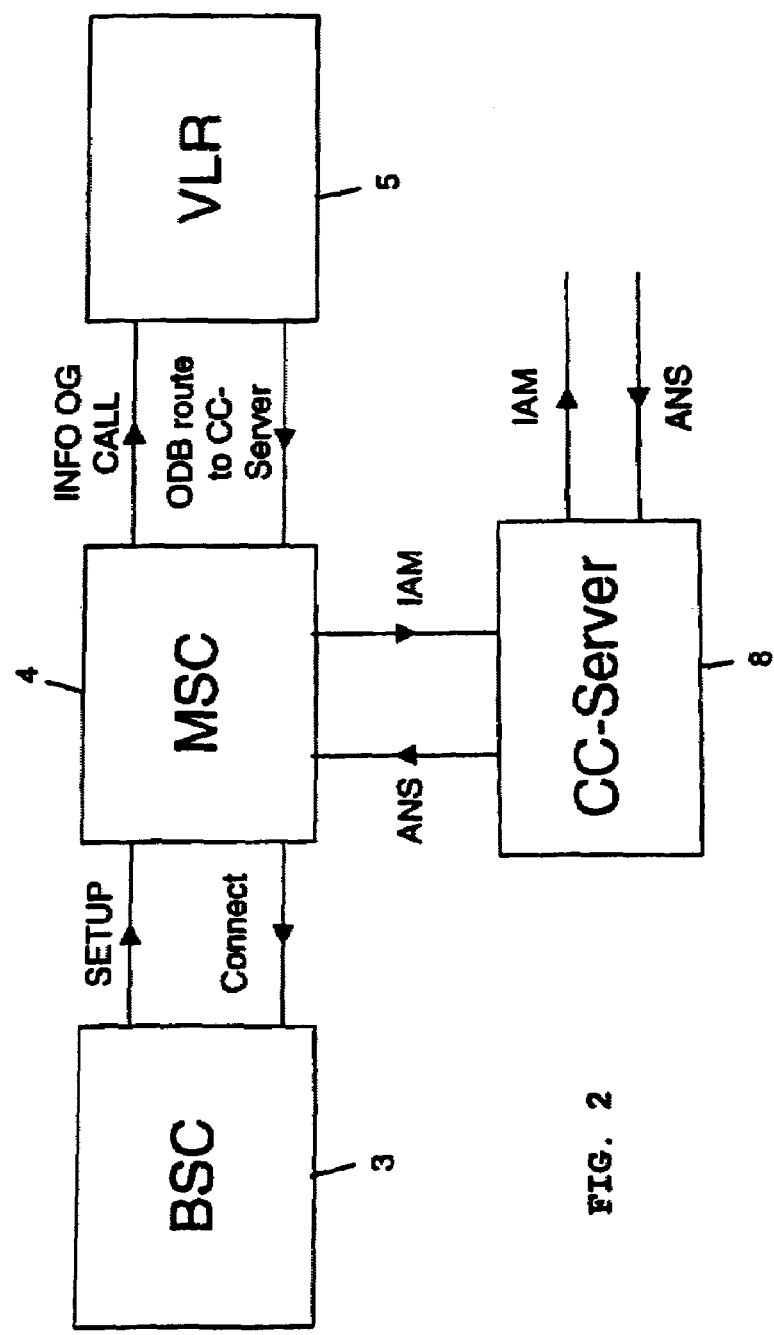
FIG. 2 shows identification and call build-up over credit card server (CC-Server)
Figure 2:
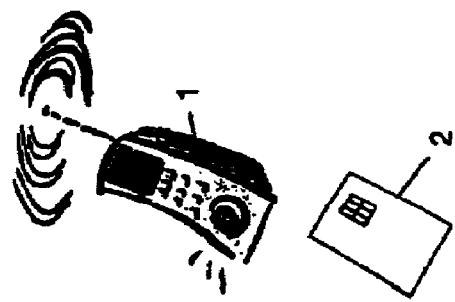

FIG. 2 shows the call build-up after completed report of the end apparatus 1 or of the SIM 2 in the mobile radio network. The call wish of the end apparatus 1 is forwarded over the BSC 3 and the MSC 4 to the VLR 5. Initiated by the special module 6 which releases a special treatment of the call wish, there occurs first of all a blocking (ODB: Operator Determined Barring) of the further connection build-up to the desired call number. Instead of this, the call is rerouted by means of an established Routing to a specially arranged credit card server 8 (CC-Server), which either is a part of the mobile radio network, therefore governed by the network operator, or can be connected externally to the mobile radio network.

The CC-Server 8 begins a dialog (speech dialog or text display) with the subscriber, in which the subscriber is requested to give his credit card number and its expiration date, for example over the keyboard of the end apparatus. These data are forwarded to the CC-Server. The CC-Server 8 checks the data given by the subscriber (validity, barring notations, etc.) of the credit card and in the "good" case gives release to the mediating station MSC 4 or the VLR 5, to switch through the call wish of the subscriber.

There occurs a more regular call build-up to the call number desired by the subscriber, in which the fees that have fallen due for the connection are computed by the network operator with the aid of the subscriber credit card data.

Figure 3:
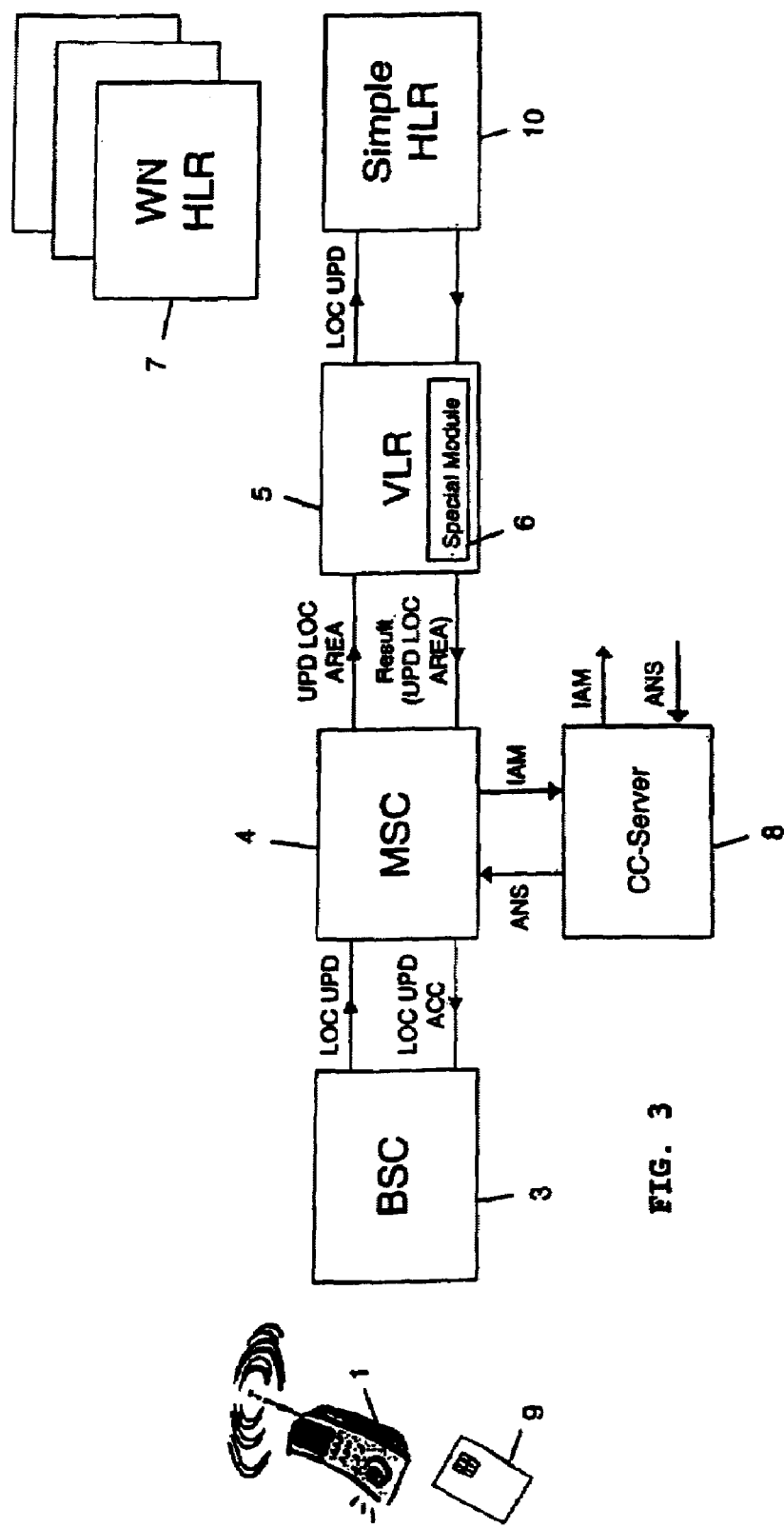
FIG. 3 shows entry into the GSM network by means of Simple-SIM and Simple-HLR.

A special form of execution of the invention according to FIG. 3 preferably uses, as access medium to the GSM network, a chip-card in the form of a so-called Simple-SIM 9, which is registered in the GSM network of the Home Operator, to be sure, but which, with respect to a Standard-SIM 2 is constructed with clearly reduced functionality. Every Simple-SIM has a special IMSI which is chosen, for example, in such manner that it characterizes the Simple-SIM clearly as such. It would also be possible to use the same IMSI for all issued Simple-SIMs, since the IMSI is not needed for the identification of a certain subscriber, but exclusively for the identification of a Simple-SIM.

Even a set-up to use a chip card-based card directly as access medium would be possible, provided that the end apparatus used supports this.

In the example according to FIGS. 1 and 2 also the use of a Simple-SIM 9 or of a special credit card is conceivable.

On network side there is arranged in addition to the regular HLR 7 a so-called Simple-HLR 10, which is appropriate exclusively for the registration of the simple SIMs. Like the regular HLR 7, the simple HLR 10 used for the registration of the simple SIMs also must have certain functionalities, especially at its interface point; but internally it can clearly be more simply implemented and, for example, have only one standard subscriber profile, no MSISDNs, simplified authentication mechanisms, etc. At least the simple HLR 10 must be capable of recognizing the IMSIs allocated to the simple SIMs as such.

Analogously to the example of execution according to FIGS. 1 and 2, the end apparatus or the Simple-SIM 9 reports to the mobile radio network, as first of all a Location Update Procedure is initiated. With the aid of the IMSI communicated from the Simple-SIM 9, the Simple-HLR 10 recognizes that a special treatment of this connection request (of the subscriber) is necessary. Since, however, the IMSI of the Simple-SIM 9 is known to the Simple-HLR 10, a regular entering of the end apparatus 1 into the mobile radio network is allowed with use of the corresponding authentication and cipher mechanisms. There, simplified authenticating and coding parameters can be used, which can be carried out with constant, uniform Challenge/Response pairs or with variable Challenge/Response pairs which are generated by cryptographic processes in the Simple-HLR 10.

Despite a completed authentication of subscriber with the aid of his Simple-SIM 9, the call further-switching by the Simple-HLR 10 is at first blocked, as an error report (ERROR) is given back to the VLR 5.

The special module 6 in the VLR 5 provides that the error reports of the simple HLR 10 are correspondingly evaluated and converted. In the use of ODB reports the call wish analogously as in the form of execution example according to FIGS. 1 and 2, is then rerouted onto a credit card server 8, where the identification of the subscriber per credit card occurs. The subscriber can then dial the target (destination) call number, and the call build up to the desired target call number can take place. With the use of an IN-trigger, the target call number can already be dialed in the dialing of the CC-server 8.

DRAWING LEGEND

1 end apparatus
2 SIM
3 Base station control (BSC)
4 Mobile radio relaying (MSC)
5 Visitor register
6 Special module
7 Homeland register (HLR)
8 Credit card server (CC-server)
9 Simple SIM
10 Simple HLR

What is claimed is:

1. A method for the simplified access to a telecommunication network and the billing of telecommunication services, in which in the telecommunication network authentication processes are used, which makes it possible for a subscriber to prove at any freely choosable point in time that a payment for service performance requested or to be requested is being made or has already been made, the method comprising:

registering of the subscriber in the mobile radio network by means of a mobile radio apparatus and a subscriber identity module SIM containing an IMSI not registered in the mobile radio network;

wherein first of all a registration of the end apparatus occurs at the appropriate base station controller BSC;

sending a Location Update Procedure over the Mobile Switching Center MSC and the Visitor Location Register VLR to the Home Location Register HLR, at which the IMSI deposited on the SIM is transferred to the HLR, wherein the HLR checks whether the IMSI is registered and in the negative case sends an error report back to the VLR;

wherein in the VLR a special module is arranged, the assignment of which is to receive the error reports, evaluate them, and release corresponding predetermined actions whereby the call is rerouted by means of an established routing to a specially arranged credit-card-server which checks the validity of a credit card of the subscriber, and in case of a valid credit card, authentication and registration of the subscriber and billing of the claimed services occurs by means of the credit card.

2. The method according to claim 1, wherein an authentication process is used by means of which the identity of the subscriber using services in the telecommunication network is established by at least one of the following measures:

by digital signature;

directly over existing dependable mechanisms;

by technical proof beyond doubt of the association of the subscriber with a dependable third party which takes responsibility for the payment.

3. The method according to claim 2, wherein the special subscriber identification module and the special Home Location Register HLR have at their disposal restricted functionalities with respect to a regularly used Standard subscriber identification module and Standard Home Location Register HLR.

4. A method for the simplified access to a telecommunication network and the billing of telecommunication services, in which in the telecommunication network authentication processes are used which make it possible for a subscriber to prove at any freely choosable point in time that a payment is being made for service performance claimed or to be claimed, or has already been made, the method comprising the following steps:

the application of the subscriber to the telecommunication network occurs with the aid of a mobile radio apparatus and a special subscriber identity module in the form of a Simple-SIM which contains a special IMSI, wherein in the telecommunication network a special Home Location Register HLR in Form of a Simple-HLR is arranged which recognizes the Simple-SIMs by means of the IMSIs and serves solely for the authentication and the registration of the special subscriber identification modules, the call routing is at first blocked by the Simple-HLR, and an error report is given back to a VLR, the VLR includes a special module which receives the error reports, evaluates them, and releases corresponding predetermined actions whereby the call is rerouted to a specially arranged credit-card-server where an identification of the subscriber and billing of the claimed services occurs by means of the credit card.

5. The method according to claim 4, wherein an authentication process is used by means of which the identity of the subscriber using services in the telecommunication network is established by at least one of the following measures:

by digital signature;

directly over existing dependable mechanisms;

by technical proof beyond doubt of the association of the subscriber with a dependable third party which takes responsibility for the payment.

6. The method according to claim 5, wherein the special subscriber identification module and the special Home Location Register HLR have at their disposal restricted functionalities with respect to a regularly used Standard subscriber identification module and Standard Home Location Register HLR.

7. The method according to claim 4, wherein the special subscriber identification module and the special Home Location Register HLR have at their disposal restricted functionalities with respect to a regularly used Standard subscriber identification module and Standard Home Location Register HLR.

8. The method according to claim 4, in which devices are present by means of which a subscriber in time context with an electronic payment process can prove to the network Operator that a payment is being made for a service claimed or to be claimed, or has already been made, characterized in that the device comprises a special module arranged in the visitor register VLR of the telecommunication network, wherein the special module comprises means for communication with a credit-card-server.

9. The method according to claim 1, in which devices are present by means of which a subscriber can prove to the network Operator, in time context with an electronic payment process, that a payment for a service claimed or to be claimed is being made, or has already been made, characterized in that the device comprises on the subscriber side a special subscriber identity module in the form of a Simple-SIM and on the network side, a special Home Location Register in the form of a Simple-HLR, and a special module arranged in the VLR of the mobile radio network with means for communication with a credit-card-server.

* * * * *

UNITED STATES PATENT AND TRADEMARK OFFICE
CERTIFICATE OF CORRECTION

PATENT NO. : 6,993,320 B1 Page 1 of 1
DATED : January 31, 2006
INVENTOR(S) : Peter Brune et al.

It is certified that error appears in the above-identified patent and that said Letters Patent is hereby corrected as shown below:

<u>Column 8,</u>
Lines 12 and 15, delete "mobile radio" and insert -- telecommunication --.

Signed and Sealed this

Twenty-fifth Day of April, 2006

JON W. DUDAS
*Director of the United States Patent and Trademark Office*